Sept. 21, 1937.　　　　R. G. AURIEN　　　　2,093,793
BRAKE ARRANGEMENT
Filed Dec. 6, 1934　　　　2 Sheets-Sheet 1

Inventor:-
Ray G. Aurien
By: Atchinson, Huxley, Byron & Knight
Attys.

Sept. 21, 1937.　　　R. G. AURIEN　　　2,093,793
BRAKE ARRANGEMENT
Filed Dec. 6, 1934　　　2 Sheets-Sheet 2
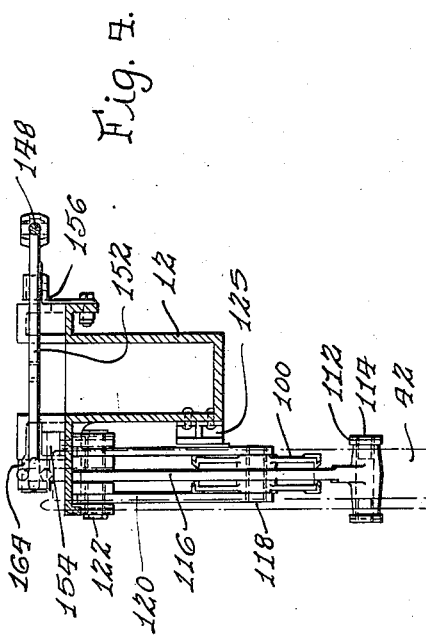
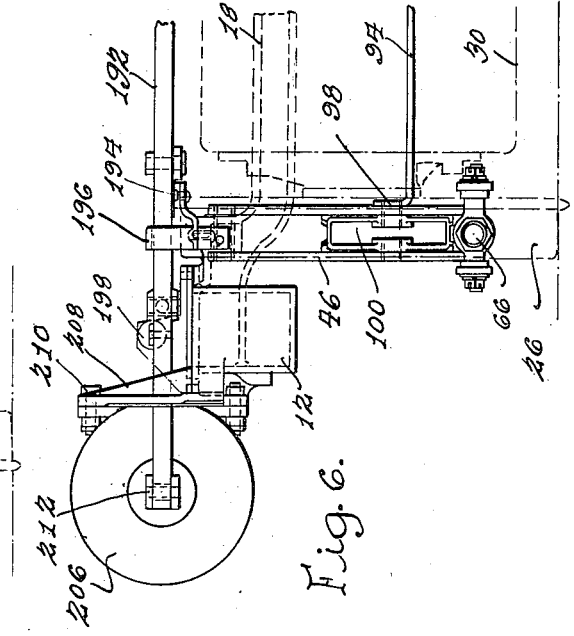
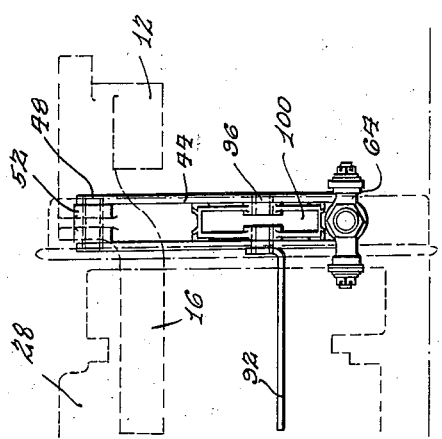
Inventor:-
Ray G. Aurien
By:- Dickinson, Huxley, Byron & Knight
Attys.

Patented Sept. 21, 1937

2,093,793

UNITED STATES PATENT OFFICE 2,093,793

BRAKE ARRANGEMENT

Ray G. Aurien, Chicago, Ill., assignor to American Steel Foundries, Chicago, Ill., a corporation of New Jersey Application December 6, 1934, Serial No. 756,352

28 Claims. (Cl. 188—46)

This invention pertains to car trucks, and more particularly to a unit cylinder clasp brake arrangement for six-wheel trucks.

It is an object of this invention to provide a six-wheel truck brake arrangement adapted particularly for use with car trucks wherein traction motors are geared to the two outer axles.

Another object is to provide a brake arrangement wherein beamless brake rigging is provided for six-wheel traction trucks.

Yet another object is to provide a brake arrangement for a six-wheel car truck adapted to be operated by unit cylinder operating means.

A further object is to provide a system of brake rigging wherein pull rod connections are used for the application of the brakes, and one which fulfills all conditions of manufacture and service.

A yet further object is to provide a brake arrangement adapted for use on trains of the high speed type wherein positive and effective braking must be provided.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 3 is a transverse end elevation taken substantially at the left end of the truck as viewed in Figure 1;

Figure 4 is a transverse sectional elevation taken substantially in the plane as indicated by the line 4—4 of Figure 1;

Figure 5 is a fragmentary transverse sectional elevation taken substantially in the plane as indicated by the line 5—5 of Figure 1;

Figure 6 is a fragmentary transverse end elevation taken substantially at the right end of the truck as viewed in Figure 1.

Figure 1:
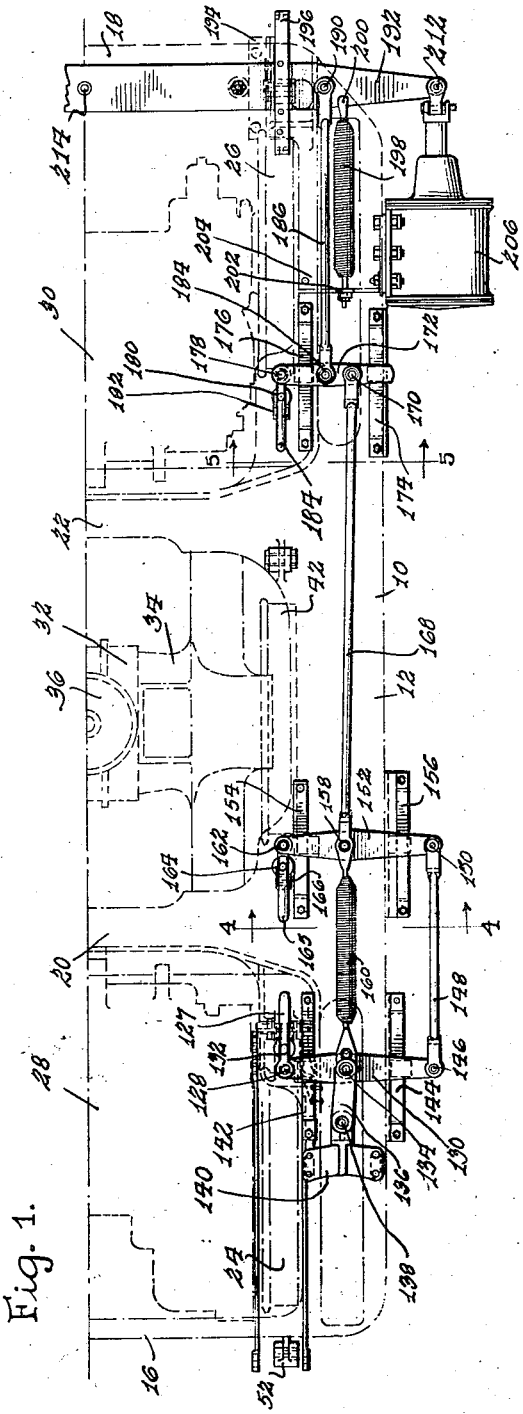
Figure 1 is a fragmentary top plan view of a truck construction having applied thereto the brake arrangement embodying the invention.

The brake arrangement herein contemplated is shown as applied to a six-wheel truck adapted particularly for use where truck motors are geared to the two end or outer axles.

In this construction the truck frame 10 consists essentially of the side frame 12 having spaced pedestals 13 for receiving journal means cooperating with the wheel and axle assemblies and said side frame is provided with the end rails 16 and 18, and the spaced transoms 20 and 22 connecting opposite side frames. The end wheel and axle assemblies 24 and 26 are disposed between the end rails 16 and 18 and their respective adjacent transoms 20 and 22, and as illustrated said wheel and axle assemblies are adapted to be driven by the end motors indicated generally at 28 and 30.

The bolster 32 is disposed between the spaced transoms 20 and 22, and consists essentially of the body portion 34, the center bearing 36, the side bearings 38, and the depending arms 40 whereby the bolster may be swingably supported as by suitable links (not shown) to the transom, the arms 40 substantially embracing the center axle of the center wheel and axle assembly 42.

The end wheel and axle assemblies 24 and 26 are each provided with the dead truck levers 44 and 46 disposed at the respective ends of the trucks and being pivotally connected as at 48 and 50 to suitable brackets 52 and 54 provided on the truck frame. The lower ends of the dead truck levers are pivotally connected as at 56 and 58 to the straps or pull rods 60 and 62, the outer ends of said straps being provided with the slack adjusters 64 and 66. The straps are disposed below the axles and are connected adjacent their inner ends as at 68 and 70 to the lower ends of the live truck levers 72 and 74. Said live truck levers are pivotally connected as at 76 and 78 to the hanger links 80 and 82, the upper ends of which are pivotally connected as at 84 and 86 to suitable brackets 88 and 90 provided on the side frame. Wear brackets 91 and 93 are provided on the side frame adjacent the end pedestals to prevent brake head and shoe assemblies 100 from working outward on the wheel face.

The respective dead truck levers 44 and 46 on opposite sides of the truck are connected by means of the straps 92 and 94, said straps being pivotally connected as at 96 and 98 intermediate the ends of the truck levers, said pivotal connections also forming the pivotal connections for the brake head and shoe assemblies 100. Brake head and shoe assemblies 100 are also pivotally connected to the live truck levers 72 and 74 at the pivotal connections 76 and 78, the dead and live levers being disposed substantially in the planes of the respective wheels.

Adjacent the center wheel and axle assembly 42 there is provided a dead truck lever 102 pivotally connected as at 104 to the bracket 106 provided on the side frame adjacent the transom 22, the dead truck lever being provided intermediate the ends thereof with a brake head and shoe assembly 100 pivotally connected as at 108 to said dead truck lever intermediate its ends. The lower end of the dead truck lever 102 is pivotally connected as at 110 to the straps 112 extending below the axle and pivotally connected as at 114 to the live truck lever 116 adjacent its ends. The live truck lever 116 is pivotally provided as at 118 with a brake shoe and head assembly 100, the pivotal connection 118 being likewise a pivotal connection for the hanger link 120. The upper end of the hanger link 120 is pivotally connected as at 122 to the bracket 124 provided on the side frame and a wear bracket 125, similar to bracket 91, is provided on the side frame adjacent the center pedestal.

The upper end of the live truck lever 72 extends through slot 127 and is pivotally connected as at 126 to the inner end 128 of the dead auxiliary lever 130 through the clevis connection 132. The dead auxiliary lever 130 is pivotally connected as at 134 to the link 136, which in turn is pivotally connected as at 138 to the bracket 140 provided on the side frame. The auxiliary lever 130 is slidably supported on the inner bracket 142 and outer bracket 144 provided on the side frame. The outer end of the auxiliary lever 130 is pivotally connected as at 146 to the pull rod 148, the opposite end of the pull rod 148 being pivotally connected as at 150 to the live auxiliary lever 152, said live auxiliary lever being slidably supported on the inner bracket 154 and the outer bracket 156 provided on the side frame. The live auxiliary lever 152 is pivotally connected as at 158 to the release spring 160, the opposite end of which is pivotally connected to the pivot point 134.

The inner end of said live auxiliary lever 152 is pivotally connected as at 162 to the clevis connection 164 which is pivotally connected as at 166 to the upper end of the intermediate live truck lever 116 which extends upwardly through slot 165 provided adjacent the transom 20. The live auxiliary lever 152 is pivotally connected as at 158 to the pull rod 168, the opposite end of said pull rod being pivotally connected to the live auxiliary lever 172 adjacent the outer end thereof as at 170, said outer end being slidably supported on the outer bracket 174, the auxiliary lever being likewise supported on the bracket 176 adjacent its inner end connection 178, the inner end connection 178 being a pivotal connection to the clevis 180 pivotally connected as at 182 to the upper end of the live truck lever 74 extending through slot 184 adjacent the transom 22. The live auxiliary lever 172 is provided intermediate the pivotal connections 170 and 178 with the pivot 184 to the pull rod 186, the opposite end of the pull rod 186 being pivotally connected as at 190 to the equalizer 192.

The equalizer 192 is slidably supported on the end rail by means of the bracket 194, the strap connection 196 being provided as retaining means for said equalizer. A release spring 198 is pivotally connected as at 200 to the equalizer. The other end of said spring is secured to the truck frame as at 202 through the bracket 204 provided on said truck frame. The operating cylinder 206 is secured to the bracket 208 provided on the side frame as at 210, and the piston of said cylinder is pivotally connected as at 212 to the end of the equalizer. The equalizer may also be provided with the connection 214 for accommodating a hand brake form of operating means.

While only half of the brake rigging has been described, it is of course understood that the brake arrangement is symmetrical on opposite sides of the truck.

In operation of this brake arrangement, assuming the brakes to be in inoperative position, movement of the piston rod toward the right, as viewed in Figure 1, causes movement of the equalizer 192 toward the right. Movement of the equalizer causes the pull rod 186 to move the live auxiliary lever 172 toward the right. Movement of the auxiliary lever 172 causes movement of the live truck lever 74 to apply its brake shoe 100 to the periphery of the wheel 26, and additional movement causes rotation of the live truck lever 74 in a clockwise direction about the pivot 78, causing the pull rod 62 to rotate the dead truck lever 46 in a clockwise direction about its pivot 50 to apply its brake shoe. Continued movement of the auxiliary lever 172 causes rotation of said lever in a counter-clockwise direction about its pivot 178, whereupon the pull rod 168 causes the live auxiliary lever 152 to move toward the right.

Figure 2:
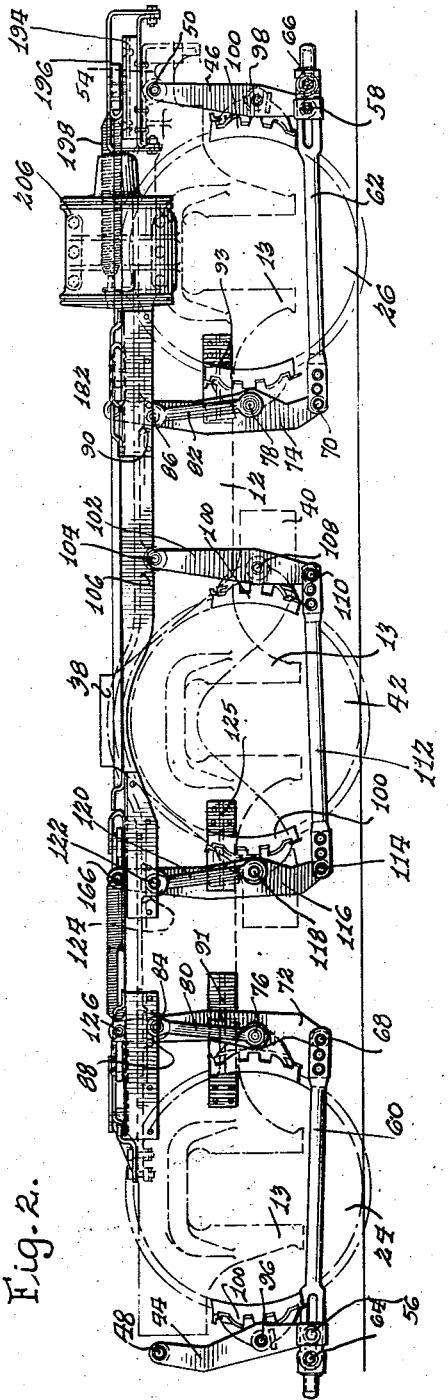
Figure 2 is a side elevation of the truck and brake arrangement illustrated in Figure 1.

This movement of the live auxiliary lever 152 causes the application of the brake head and shoe assemblies 100 of the live and dead truck levers 116 and 102 in a manner similar to that already described with respect to truck levers 74 and 46. Continued movement of the auxiliary lever 152 causes rotation of said lever about the pivot 162, whereupon the pull rod 148 causes rotation of the dead auxiliary lever 130 about its pivot 134 so that the upper end of the live truck lever 72 is caused to be moved toward the left as viewed in Figure 2 to apply its brake head and shoe arrangement to the periphery of the wheel 24 and to cause the pull rod 60 to apply the brake head and shoe arrangement of the dead truck lever 44 to the opposite side of wheel 24.

Release of the operating fluid of the cylinder 206 causes release of the brake rigging from braking position, movement in a reverse direction to that described occurring, aided by release springs 160 and 198. Of course where a hand brake mechanism is used, connected to the point 214, similar operation occurs.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a six-wheel car truck, the combination of a truck frame, spaced wheel and axle assemblies supporting said frame, a live and dead truck lever disposed on opposite sides of each of the wheels, a brake shoe supported by each truck lever intermediate the ends of the lever and adapted to have braking cooperation with the periphery of the adjacent wheel, a connection between adjacent live and dead truck levers below the axle, a dead auxiliary lever pivoted intermediate the ends thereof to said frame and connected at the inner end thereof to the live truck lever of an end wheel and axle assembly, a live auxiliary lever slidably supported on said frame adjacent the wheel and axle assembly at the opposite end of said frame from said first-named end, said live auxiliary lever being connected adjacent the inner end thereof to the live truck lever of the last-named wheel and axle assembly, a live auxiliary lever slidably mounted on said frame adjacent the intermediate wheel and axle assembly and disposed between said first-named wheel and axle assembly and said intermediate wheel and axle assembly, said second-named live auxiliary lever being connected at the inner end thereof to the live truck lever of said intermediate wheel and axle assembly, a connection between the ends of said dead auxiliary lever and said second-named auxiliary lever, a pull rod connected to said second-named live auxiliary lever intermediate the ends thereof and to said first-named auxiliary lever adjacent the outer end thereof, an equalizer slidably supported on said truck frame adjacent the second-named end thereof, a cylinder supported on said frame and having a piston connected to said equalizer, a pull rod connected to said equalizer and to said first-named live auxiliary lever intermediate the ends thereof, and release springs connected to said frame and to said second-named auxiliary lever and to said equalizer.

2. In a six-wheel car truck, the combination of a truck frame, spaced wheel and axle assemblies supporting said frame, a live and dead truck lever disposed on opposite sides of each of the wheels, a brake shoe supported by each truck lever and adapted to have braking cooperation with the periphery of the adjacent wheel, a connection between adjacent live and dead truck levers, a dead auxiliary lever pivoted intermediate the ends thereof to said frame and connected at the inner end thereof to the live truck lever of an end wheel and axle assembly, a live auxiliary lever slidably supported on said frame adjacent the wheel and axle assembly at the opposite end of said frame from said first-named end, said live auxiliary lever being connected adjacent the inner end thereof to the live truck lever of the last-named wheel and axle assembly, a live auxiliary lever slidably mounted on said frame adjacent the intermediate wheel and axle assembly and disposed between said first-named wheel and axle assembly and said intermediate wheel and axle assembly, said second named live auxiliary lever being connected at the inner end thereof to the live truck lever of said intermediate wheel and axle assembly, a connection between the ends of said dead auxiliary lever and said second-named auxiliary lever, a pull rod connected to said second-named live auxiliary lever intermediate the ends thereof and to said first-named auxiliary lever adjacent the outer end thereof, an equalizer slidably supported on said truck frame adjacent the second-named end thereof, a cylinder supported on said frame and having a piston connected to said equalizer, a pull rod connected to said equalizer and to said first-named live auxiliary lever intermediate the ends thereof, and release springs connected to said frame and to said second-named auxiliary lever and to said equalizer.

3. In a six-wheel car truck, the combination of a truck frame, spaced wheel and axle assemblies supporting said frame, a live and dead truck lever disposed on opposite sides of each of the wheels, a brake shoe supported by each truck lever intermediate the ends of the lever and adapted to have braking cooperation with the periphery of the adjacent wheel, a connection between adjacent live and dead truck levers below the axle, a dead auxiliary lever pivoted intermediate the ends thereof to said frame and connected at the inner end thereof to the live truck lever of an end wheel and axle assembly, a live auxiliary lever slidably supported on said frame adjacent the wheel and axle assembly at the opposite end of said frame from said first-named end, said live auxiliary lever being connected adjacent the inner end thereof to the live truck lever of the last-named wheel and axle assembly, a live auxiliary lever slidably mounted on said frame adjacent the intermediate wheel and axle assembly and disposed between said first-named wheel and axle assembly and said intermediate wheel and axle assembly, said second-named live auxiliary lever being connected at the inner end thereof to the live truck lever of said intermediate wheel and axle assembly, a connection between the ends of said dead auxiliary lever and said second-named auxiliary lever, a pull rod connected to said second-named live auxiliary lever intermediate the ends thereof and to said first-named auxiliary lever adjacent the outer end thereof, an equalizer slidably supported on said truck frame adjacent the second-named end thereof, and operating means connected to said equalizer.

4. In a six-wheel car truck, the combination of a truck frame, spaced wheel and axle assemblies supporting said frame, a live and dead truck lever disposed on opposite sides of each of the wheels, a brake shoe supported by each truck lever and adapted to have braking cooperation with the periphery of the adjacent wheel, a connection between adjacent live and dead truck levers, a dead auxiliary lever pivoted intermediate the ends thereof to said frame and connected at the inner end thereof to the live truck lever of an end wheel and axle assembly, a live auxiliary lever slidably supported on said frame adjacent the wheel and axle assembly at the opposite end of said frame from said first-named end, said live auxiliary lever being connected adjacent the inner end thereof to the live truck lever of the last-named wheel and axle assembly, a live auxiliary lever slidably mounted on said frame adjacent the intermediate wheel and axle assembly and disposed between said first-named wheel and axle assembly and said intermediate wheel and axle assembly, said second-named live auxiliary lever being connected at the inner end thereof to the live truck lever of said intermediate wheel and axle assembly, a connection between the ends of said dead auxiliary lever and said second-named auxiliary lever, a pull rod connected to said second-named live auxiliary lever intermediate the ends thereof and to said first-named auxiliary lever adjacent the outer end thereof, an equalizer slidably supported on said truck frame adjacent the second-named end thereof, and operating means connected to said equalizer.

5. In a six-wheel car truck, the combination of a truck frame, spaced wheel and axle assemblies supporting said frame, a live and dead truck lever disposed on opposite sides of each of the wheels, a brake shoe supported by each truck lever intermediate the ends of the lever and adapted to have braking cooperation with the periphery of the adjacent wheel, a connection between adjacent live and dead truck levers below the axle, a dead auxiliary lever pivoted intermediate the ends thereof to said frame and connected at the inner end thereof to the live truck lever of an end wheel and axle assembly, a live auxiliary lever slidably supported on said frame adjacent the wheel and axle assembly at the opposite end of said frame from said first-named end, said live auxiliary lever being connected adjacent the inner end thereof to the live truck lever of the last-named wheel and axle assembly, a live auxiliary lever slidably mounted on said frame adjacent the intermediate wheel and axle assembly and disposed between said first-named wheel and axle assembly and said intermediate wheel and axle assembly, said second-named live auxiliary lever being connected at the inner end thereof to the live truck lever of said intermediate wheel and axle assembly, a connection between the ends of said dead auxiliary lever and said second named auxiliary lever, a pull rod connected to said second-named live auxiliary lever intermediate the ends thereof and to said first-named auxiliary lever adjacent the outer end thereof, and a cylinder supported on said truck frame and operatively connected to said first-named live auxiliary lever.

6. In a six-wheel car truck, the combination of a truck frame, spaced wheel and axle assemblies supporting said frame, a live and dead truck lever disposed on opposite sides of each of the wheels, a brake shoe supported by each truck lever and adapted to have braking cooperation with the periphery of the adjacent wheel, a connection between adjacent live and dead truck levers, a dead auxiliary lever pivoted to said frame and connected to the live truck lever of an end wheel and axle assembly, a live auxiliary lever slidably supported on said frame adjacent the wheel and axle assembly at the opposite end of said frame from said first-named end, said live auxiliary lever being connected to the live truck lever of the last-named wheel and axle assembly, a live auxiliary lever slidably mounted on said frame adjacent the intermediate wheel and axle assembly and connected to the live truck lever of said intermediate wheel and axle assembly, a connection between said dead auxiliary lever and said second-named auxiliary lever, a pull rod connected to said second-named live auxiliary lever and to said first-named auxiliary lever, an equalizer slidably supported on said truck frame adjacent the second-named end thereof, a cylinder supported on said frame and having a piston connected to said equalizer, a pull rod connected to said equalizer and to said first-named live auxiliary lever, and release springs connected to said frame and to said second-named auxiliary lever and to said equalizer.

7. In a six-wheel car truck, the combination of a truck frame, spaced wheel and axle assemblies supporting said frame, a live and dead truck lever disposed on opposite sides of each of the wheels, a brake shoe supported by each truck lever intermediate the ends of the lever and adapted to have braking cooperation with the periphery of the adjacent wheel, a connection between adjacent live and dead truck levers below the axle, a dead auxiliary lever pivoted intermediate the ends thereof to said frame and connected at the inner end thereof to the live truck lever of an end wheel and axle assembly, a live auxiliary lever slidably supported on said frame adjacent the wheel and axle assembly at the opposite end of said frame from said first-named end, said live auxiliary lever being connected adjacent the inner end thereof to the live truck lever of the last-named wheel and axle assembly, a live auxiliary lever slidably mounted on said frame adjacent the intermediate wheel and axle assembly and disposed between said first-named wheel and axle assembly and said intermediate wheel and axle assembly, said second named live auxiliary lever being connected at the inner end thereof to the live truck lever of said intermediate wheel and axle assembly, a connection between the ends of said dead auxiliary lever and said second-named auxiliary lever, a pull rod connected to said second-named live auxiliary lever intermediate the ends thereof and to said first-named auxiliary lever adjacent the outer end thereof, an equalizer slidably supported on said truck frame adjacent the second-named end thereof, a cylinder supported on said frame and having a piston connected to said equalizer, and a pull rod connected to said equalizer and to said first-named live auxiliary lever.

8. In a six-wheel car truck, the combination of a truck frame, spaced wheel and axle assemblies supporting said frame, a live and dead truck lever disposed on opposite sides of each of the wheels, a brake shoe supported by each truck lever and adapted to have braking cooperation with the periphery of the adjacent wheel, a connection between adjacent live and dead truck levers, a dead auxiliary lever pivoted to said frame and connected to the live truck lever of an end wheel and axle assembly, a live auxiliary lever slidably supported on said frame adjacent the wheel and axle assembly at the opposite end of said frame from said first-named end, said live auxiliary lever being connected to the live truck lever of the last-named wheel and axle assembly, a live auxiliary lever slidably mounted on said frame adjacent the intermediate wheel and axle assembly and connected to the live truck lever of said intermediate wheel and axle assembly, a connection between said dead auxiliary lever and said second-named auxiliary lever, a pull rod connected to said second-named live auxiliary lever and to said first-named auxiliary lever, an equalizer slidably supported on said truck frame adjacent the second-named end thereof, a cylinder supported on said frame and having a piston connected to said equalizer, and a pull rod connected to said equalizer and to said first-named live auxiliary lever.

9. In a six-wheel car truck, the combination of a truck frame, spaced wheel and axle assemblies supporting said frame, a live and dead truck lever disposed on opposite sides of each of the wheels, a brake shoe supported by each truck lever and adapted to have braking cooperation with the periphery of the adjacent wheel, a connection between adjacent live and dead truck levers, a dead auxiliary lever pivoted to said frame and connected to the live truck lever of an end wheel and axle assembly, a live auxiliary lever slidably supported on said frame adjacent the wheel and axle assembly at the opposite end of said frame from said first-named end, said live auxiliary lever being connected to the live truck lever of the last-named wheel and axle assembly, a live auxiliary lever slidably mounted on said frame adjacent the intermediate wheel and axle assembly and connected to the live truck lever of said intermediate wheel and axle assembly, a connection between said dead auxiliary lever and said second-named auxiliary lever, a pull rod connected to said second-named live auxiliary lever and to said first-named auxiliary lever, a cylinder supported on said frame and having a piston operatively connected to said first-named live auxiliary lever, and release springs operatively connected to said frame and to said live auxiliary levers.

10. In a six-wheel car truck, the combination of a truck frame, spaced wheel and axle assemblies supporting said frame, a live and dead truck lever disposed on opposite sides of each of the wheels, a brake shoe supported by each truck lever and adapted to have braking cooperation with the periphery of the adjacent wheel, a connection between adjacent live and dead truck levers, the dead auxiliary lever pivoted to said frame and connected to the live truck lever of an end wheel and axle assembly, a live auxiliary lever slidably supported on said frame adjacent the wheel and axle assemby at the opposite end of said frame from said first-named end, said live auxiliary lever being connected to the live truck lever of the last-named wheel and axle assembly, a live auxiliary lever slidably mounted on said frame adjacent the intermediate wheel and axle assembly and connected to the live truck lever of said intermediate wheel and axle assembly, a connection between said dead auxiliary lever and said second-named auxiliary lever, a pull rod connected to said second-named live auxiliary lever and to said first-named auxiliary lever, and operating means connected to said first-named live auxiliary lever.

11. In a car truck, the combination of a truck frame, spaced wheel and axle assemblies supporting said frame, a live and dead truck lever disposed on opposite sides of each of the wheels, a brake shoe supported by each truck lever, a connection between adjacent live and dead truck levers, a dead auxiliary lever pivoted intermediate the ends thereof to said frame and connected at the inner end thereof to the live truck lever of one of the wheel and axle assemblies, a live auxiliary lever slidably mounted on said frame intermediate adjacent wheel and axle assemblies and having the outer end thereof connected to the outer end of said first-named auxiliary lever, a second named live auxiliary lever being mounted on said truck frame and connected to said live auxiliary lever, and operating means connected to said second-named auxiliary lever, said operating means including a cylinder supported on said frame and having a piston connected to said second-named auxiliary lever.

12. In a car truck, the combination of a truck frame, spaced wheel and axle assemblies supporting said frame, a live and dead truck lever disposed on opposite sides of each of the wheels a brake shoe supported by each truck lever and adapted to have braking cooperation with the periphery of the adjacent wheel, a connection between adjacent live and dead truck levers, a live auxiliary lever disposed at one side of one of said wheel and axle assemblies and having the inner end thereof connected to the live truck lever of said wheel and axle assembly, a live auxiliary lever mounted on said truck frame at the opposite side of the wheel from said first-named auxiliary lever and disposed between adjacent wheels, the inner end of said second-named auxiliary lever being connected to the live truck lever of another of the wheel and axle assemblies, a connection between the outer end of said first-named auxiliary lever adjacent the center thereof, and operating means connected to said second-named auxiliary lever intermediate the connections between said second-named auxiliary lever and said first-named auxiliary lever and the associated live truck lever.

13. In a car truck, the combination of a truck frame, spaced wheel and axle assemblies supporting said frame, a live and dead truck lever disposed on opposite sides of each of the wheels, a brake shoe supported by each truck lever and adapted to have braking cooperation with the periphery of the adjacent wheel, a connection between adjacent live and dead truck levers, a live auxiliary lever disposed at one side of one of said wheel and axle assemblies and having the inner end thereof connected to the live truck lever of said wheel and axle assembly, a live auxiliary lever mounted on said truck frame at the opposite side of the wheel from said first-named auxiliary lever and disposed between adjacent wheels, the inner end of said second-named auxiliary lever being connected to the live truck lever of another of the wheel and axle assemblies, a connection between the outer end of said first-named auxiliary lever adjacent the center thereof, and operating means connected to said second-named auxiliary lever intermediate the connections between said second-named auxiliary lever and said first-named auxiliary lever and the associated live truck lever, said operating means including a cylinder mounted on said truck frame and having a piston connected to said second-named auxiliary lever at the intermediate point thereof.

14. In a six-wheel car truck, the combination of a truck frame, spaced wheel and axle assemblies supporting said frame, truck levers disposed on opposite sides of each of the wheels, a brake shoe supported by each truck lever and adapted to have braking cooperation with the periphery of the adjacent wheel, a connection between adjacent truck levers of each wheel, a dead auxiliary lever pivoted intermediate the ends thereof to said frame and connected to the inner end of one of the truck levers of an end wheel and axle assembly, a live auxiliary lever slidably supported on said frame adjacent the wheel and axle assembly at the opposite end of said frame from said first-named end, said live auxiliary lever being connected adjacent the inner end thereof to a truck lever of the last-named wheel and axle assembly, a connection between said auxiliary levers, said connection including a connection to a truck lever of the intermediate wheel and axle assembly, an equalizer slidably mounted on said truck frame adjacent the second-named end thereof, a cylinder mounted on said frame and having a piston connected to said equalizer, and a pull rod connected to said equalizer and said live auxiliary lever.

15. In a six-wheel car truck, the combination of a truck frame, spaced wheel and axle assemblies supporting said frame, a live and dead truck lever disposed on opposite sides of each of the wheels, a brake shoe supported by each truck lever intermediate the ends of the lever and adapted to have braking cooperation with the periphery of the adjacent wheel, a connection between adjacent live and dead truck levers below the axle, a dead auxiliary lever pivoted intermediate the ends thereof to said frame and connected at the inner end thereof to the live truck lever of an end wheel and axle assembly, a live auxiliary lever slidably supported on said frame adjacent the wheel and axle assembly at the opposite end of said frame from said first-named end, said live auxiliary lever being connected adjacent the inner end thereof to the live truck lever of the last-named wheel and axle assembly, a live auxiliary lever slidably mounted on said frame adjacent the intermediate wheel and axle assembly, said second-named live auxiliary lever being connected at the inner end thereof to the live truck lever of said intermediate wheel and axle assembly, a connection between the ends of said dead auxiliary lever and said second-named auxiliary lever, a pull rod connected to said second-named live auxiliary lever intermediate the ends thereof and to said first-named auxiliary lever adjacent the outer end thereof, an equalizer slidably supported on said truck frame adjacent the second-named end thereof, a cylinder supported on said frame and having a piston connected to said equalizer, a pull rod connected to said equalizer and to said first-named live auxiliary lever intermediate the ends thereof, and release springs connected to said frame and to said second-named auxiliary lever and to said equalizer.

16. In a six-wheel car truck, the combination of a truck frame, spaced wheel and axle assemblies supporting said frame, a live and dead truck lever disposed on opposite sides of each of the wheels, a brake shoe supported by each truck lever intermediate the ends of the lever and adapted to have braking cooperation with the periphery of the adjacent wheel, a connection between adjacent live and dead truck levers below the axle, a dead auxiliary lever pivoted intermediate the ends thereof to said frame and connected at the inner end thereof to the live truck lever of an end wheel and axle assembly, a live auxiliary lever slidably supported on said frame adjacent the wheel and axle assembly at the opposite end of said frame from said first-named end, said live auxiliary lever being connected adjacent the inner end thereof to the live truck lever of the last-named wheel and axle assembly, a live auxiliary lever slidably mounted on said frame adjacent the intermediate wheel and axle assembly and disposed between said first-named wheel and axle assembly and said intermediate wheel and axle assembly, said second-named live auxiliary lever being connected at the inner end thereof to the live truck lever of said intermediate wheel and axle assembly, a connection between the ends of said dead auxiliary lever and said second-named auxiliary lever, a pull rod connected to said second-named live auxiliary lever intermediate the ends thereof and to said first-named auxiliary lever adjacent the outer end thereof, an equalizer slidably supported on said truck frame adjacent the second-named end thereof, a cylinder supported on said frame and having a piston connected to said equalizer, a pull rod connected to said equalizer and to said first-named live auxiliary lever intermediate the ends thereof, release springs connected to said frame and to said second-named auxiliary lever and to said equalizer, and wear brackets disposed on said truck frame adjacent said live truck levers for spacing said truck levers from said frame.

17. In a car truck, the combination of a truck frame, spaced wheel and axle assemblies supporting said frame, brake rigging adapted to have braking cooperation with said wheels, means for operating said brake rigging including a live lever slidably mounted adjacent the outer end thereof on said truck frame, the inner end of said live lever being operatively connected to said brake rigging, a second live lever connected to said first named live lever and connected adjacent the inner end thereof to said brake rigging, and means for actuating said first named live lever connected to said live lever intermediate the ends thereof.

18. In a car truck, the combination of a truck frame, spaced wheel and axle assemblies supporting said frame, brake rigging adapted to have braking cooperation with said wheels, means for operating said brake rigging including a live lever connected adjacent the inner end thereof to said brake rigging, a second live lever connected to said first named live lever and connected adjacent the inner end thereof to said brake rigging, actuating means connected to said first named live lever intermediate the ends thereof, a dead lever connected adjacent the inner end thereof to said brake rigging, a connection between the outer ends of said dead and said second named live levers, and release means interposed between said dead and said second named live levers, and connected to one of said levers intermediate the ends thereof.

19. In a car truck, the combination of a truck frame, spaced wheel and axle assemblies supporting said frame, brake rigging adapted to have braking cooperation with said wheels, means for operating said brake rigging including a live lever connected adjacent the inner end thereof to said brake rigging, a live lever connected to said first named live lever and adjacent its inner end to said brake rigging, actuating means connected to said first named live lever intermediate the ends thereof, a dead lever connected adjacent the inner end thereof to said brake rigging, a connection between the outer ends of said dead and said second named live levers, and release means interposed between said dead and said second named live levers, and connected to said live lever intermediate the ends thereof.

20. In a car truck, the combination of a truck frame, spaced wheel and axle assemblies supporting said frame, brake rigging adapted to have braking cooperation with said wheels, means for operating said brake rigging including a live lever slidably mounted adjacent the outer end thereof on said truck frame, the inner end of said live lever being operatively connected to said brake rigging, a second live lever connected to said first named live lever and connected adjacent the inner end thereof to said brake rigging, a dead lever connected adjacent the inner end thereof to said brake rigging and operatively connected to said second named live lever, and means for actuating said first named live lever connected to said live lever intermediate the ends thereof.

21. In a car truck, the combination of a truck frame, spaced wheel and axle assemblies supporting said frame, brake rigging adapted to have braking cooperation with said wheels, means for operating said brake rigging including a live lever slidably mounted adjacent the outer end thereof on said truck frame, the inner end of said live lever, being operatively connected to said brake rigging, a live lever connected adjacent the inner end thereof to said brake rigging and operatively connected to said first named live lever, and means for actuating said first named live lever connected thereto intermediate the ends thereof.

22. In a car truck, the combination of a truck frame, spaced wheel and axle assemblies supporting said frame, brake rigging adapted to have braking cooperation with said wheels, means for operating said brake rigging including a live lever slidably mounted adjacent the outer end thereof on said truck frame, the inner end of said live lever, being operatively connected to said brake rigging, a live lever connected adjacent the inner end thereof to said brake rigging and operatively connected to said first named live lever by means connected to said first named live lever adjacent an end thereof and to said second named live lever intermediate the ends thereof, and means for actuating said first named live lever connected thereto intermediate the ends thereof.

23. In a car truck, the combination of a truck frame, spaced wheel and axle assemblies supporting said frame, brake rigging adapted to have braking cooperation with said wheels, means for operating said brake rigging including a live lever slidably mounted adjacent the outer end thereof on said truck frame, the inner end of said live lever being operatively connected to said brake rigging, a live lever connected to said brake rigging and operatively connected to said first named live lever, and means for actuating said first named live lever connected thereto intermediate the ends thereof.

24. In a car truck, the combination of a truck frame, spaced wheel and axle assemblies supporting said frame, brake rigging adapted to have braking cooperation with said wheels, means for operating said brake rigging including a live lever slidably mounted adjacent the outer end thereof on said truck frame, the inner end of said live lever being operatively connected to said brake rigging, a live lever connected to said brake rigging and operatively connected to said first named live lever by means connected to said first named live lever adjacent an end thereof and to said second named live lever intermediate the ends thereof, and means for actuating said first named live lever connected thereto intermediate the ends thereof.

25. In a car truck, the combination of a truck frame, spaced wheel and axle assemblies supporting said frame, brake rigging adapted to have braking cooperation with said wheels, means for operating said brake rigging including spaced live levers mounted on said frame, each of said levers being connected adjacent the inner end thereof to said brake rigging, said levers being connected together by means connected to one of said levers intermediate the ends thereof and to the other adjacent an end thereof, and means connected to one of said levers for actuating said levers.

26. In a car truck, the combination of a truck frame, spaced wheel and axle assemblies supporting said frame, brake rigging adapted to have braking cooperation with said wheels, means for operating said brake rigging including spaced live levers mounted on said frame, each of said levers being connected adjacent the inner end thereof to said brake rigging, said levers being connected together by means connected to one of said levers intermediate the ends thereof and to the other adjacent an end thereof, and means connected to one of said levers and intermediate the ends thereof for actuating said levers.

27. In a car truck, the combination of a truck frame, spaced wheel and axle assemblies supporting said frame, brake rigging adapted to have braking cooperation with said wheels, means for operating said brake rigging including spaced live levers mounted on said frame, each of said levers being connected adjacent the inner end thereof to said brake rigging, said levers being connected together by means connected to one of said levers intermediate the ends thereof and to the other adjacent an end thereof, a dead lever connected adjacent the inner end thereof to said brake rigging, a connection between the outer ends of said dead lever and one of said live levers, and means connected to one of said live levers for actuating said levers.

28. In a car truck, the combination of a truck frame, spaced wheel and axle assemblies supporting said frame, brake rigging adapted to have braking cooperation with said wheels, means for operating said brake rigging including spaced live levers mounted on said frame, each of said levers being connected adjacent the inner end thereof to said brake rigging, said levers being connected together by means connected to one of said levers intermediate the ends thereof and to the other adjacent an end thereof, a dead lever connected adjacent the inner end thereof to said brake rigging, a connection between the outer ends of said dead lever and one of said live levers, and means connected to one of said live levers and intermediate the ends thereof for actuating said levers.

RAY G. AURIEN.